US011176340B2

(12) United States Patent
Gerst, III et al.

(10) Patent No.: US 11,176,340 B2
(45) Date of Patent: Nov. 16, 2021

(54) SYSTEM AND METHOD FOR CONFIGURING AN ID READER USING A MOBILE DEVICE

(71) Applicant: Cognex Corporation, Natick, MA (US)

(72) Inventors: Carl W. Gerst, III, Clifton Park, NY (US); James A. Negro, Arlington, MA (US); Shane Michael LaChappelle, South Lyon, MI (US); Vladimir Zivkovic, Ruma (RS)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 15/278,218

(22) Filed: Sep. 28, 2016

(65) Prior Publication Data
US 2018/0089481 A1 Mar. 29, 2018

(51) Int. Cl.
| | |
|---|---|
| G06K 9/80 | (2006.01) |
| G06K 7/10 | (2006.01) |
| G06Q 30/00 | (2012.01) |
| G06Q 10/08 | (2012.01) |
| H04M 1/72403 | (2021.01) |
| H04W 76/10 | (2018.01) |
| G06K 7/14 | (2006.01) |
| G06K 19/06 | (2006.01) |
| H04L 29/08 | (2006.01) |
| H04M 1/2755 | (2006.01) |
| H04M 1/02 | (2006.01) |

(52) U.S. Cl.
CPC ...... *G06K 7/10811* (2013.01); *G06K 7/10544* (2013.01); *G06K 7/10732* (2013.01); *G06K 7/10881* (2013.01); *G06K 7/1417* (2013.01); *G06K 19/06037* (2013.01); *G06K 19/06112* (2013.01); *G06Q 10/0833* (2013.01); *G06Q 30/016* (2013.01); *H04L 67/34* (2013.01); *H04M 1/72403* (2021.01); *H04W 76/10* (2018.02); *H04M 1/0264* (2013.01); *H04M 1/2755* (2013.01); *H04M 2250/52* (2013.01)

(58) Field of Classification Search
USPC ........... 235/462.11, 462.15, 462.25, 462.45, 235/472.02
See application file for complete search history.

(56) References Cited

U.S. PATENT DOCUMENTS

| | | |
|---|---|---|
| 6,311,896 B1 | 11/2001 | Mulla et al. |
| 6,607,133 B2 | 8/2003 | Wilz, Sr. et al. |

(Continued)

*Primary Examiner* — Daniel St Cyr
(74) *Attorney, Agent, or Firm* — Loginov & Associates, PLLC; William A. Loginov

(57) ABSTRACT

A system and method for communicating at least one of updated configuration information and hardware setup recommendations to a user of an ID decoding vision system is provided. An image of an object containing one or more IDs is acquired with a mobile device. The ID associated with the object is decoded to derive information. Physical dimensions of the ID associated with the object are determined. Based on the information and the dimensions, configuration data can be transmitted to a remote server that automatically determines setup information for the vision system based upon the configuration data. The remote server thereby transmits at least one of (a) updated configuration information to the vision system and (b) hardware setup recommendations to a user of the vision system based upon the configuration data.

13 Claims, 9 Drawing Sheets

(56) References Cited

U.S. PATENT DOCUMENTS

| | | | |
|---|---|---|---|
| 6,732,933 | B2 | 5/2004 | Waxelbaum |
| 6,772,949 | B2 | 8/2004 | Wilz, Sr. et al. |
| 7,287,696 | B2 | 10/2007 | Attia et al. |
| 7,490,774 | B2 | 2/2009 | Zhu et al. |
| 9,158,770 | B1* | 10/2015 | Beadles ............ G06F 17/30011 |
| 2003/0030638 | A1 | 2/2003 | Astrom et al. |
| 2006/0152595 | A1 | 7/2006 | Ryu et al. |
| 2007/0181691 | A1 | 8/2007 | Chang |
| 2007/0194123 | A1 | 8/2007 | Frantz et al. |
| 2007/0284441 | A1 | 12/2007 | Walczyk et al. |
| 2008/0016812 | A1 | 1/2008 | Johnson |
| 2008/0073434 | A1 | 3/2008 | Epshteyn et al. |
| 2010/0092093 | A1 | 4/2010 | Akatsuka et al. |
| 2010/0292002 | A1 | 11/2010 | Ward et al. |
| 2013/0155474 | A1 | 6/2013 | Roach et al. |
| 2013/0159178 | A1 | 6/2013 | Colon et al. |
| 2013/0277430 | A1* | 10/2013 | Zumsteg ............ G06K 7/10009 235/462.09 |
| 2013/0334300 | A1 | 12/2013 | Evans |
| 2014/0016712 | A1 | 1/2014 | Tanaka et al. |
| 2016/0125217 | A1 | 5/2016 | Todeschini |
| 2016/0370220 | A1* | 12/2016 | Ackley ................ G01B 11/02 |
| 2017/0220833 | A1* | 8/2017 | Zhu .................... G06K 7/10396 |

* cited by examiner

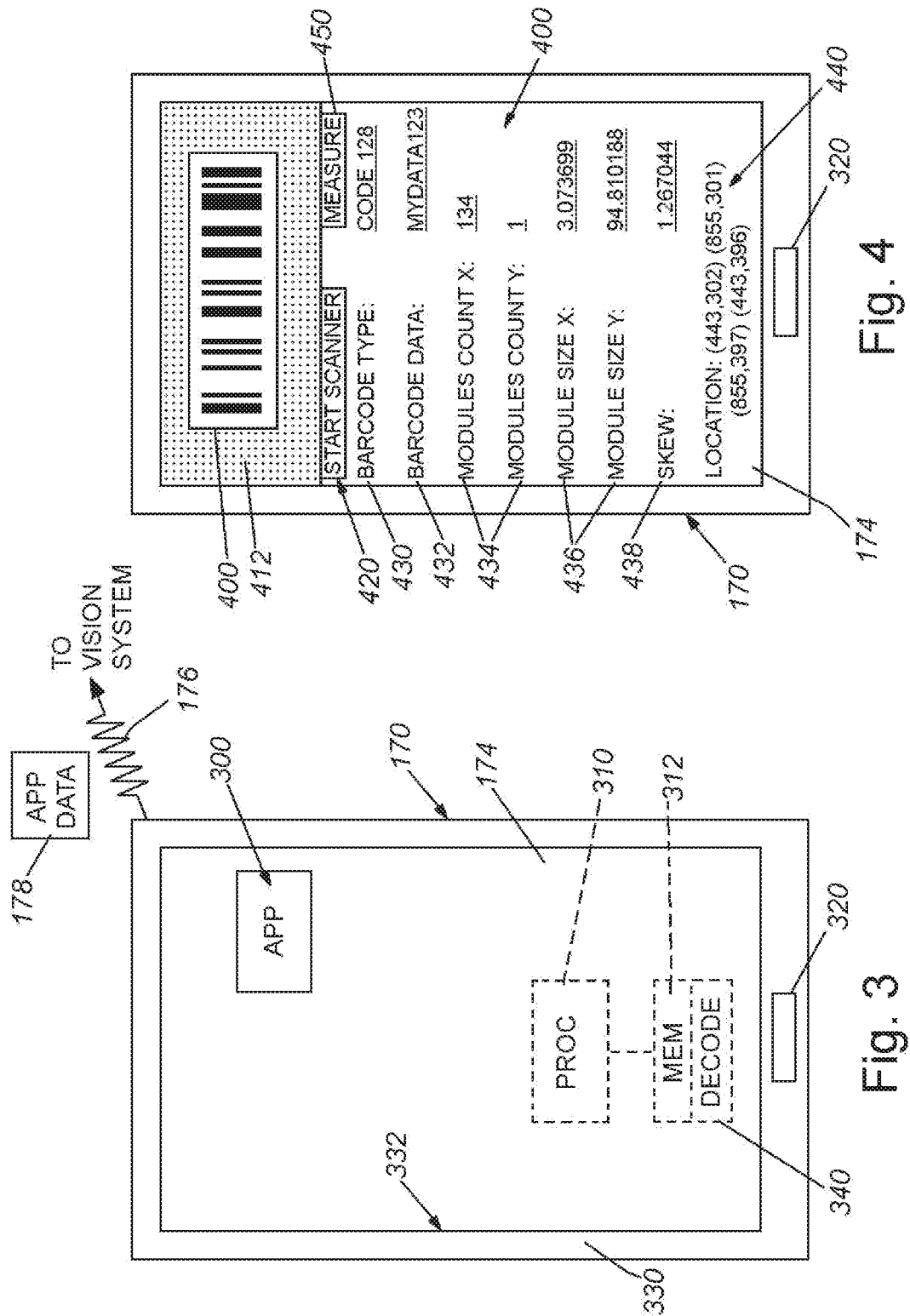

SYSTEM AND METHOD FOR CONFIGURING AN ID READER USING A MOBILE DEVICE

FIELD OF THE INVENTION

This invention relates to machine vision systems for finding and decoding machine-readable symbols (e.g. two-dimensional (2D) matrix symbols or other "IDs"), and more particularly to systems and methods for setup of such vision systems (also termed "ID readers").

BACKGROUND OF THE INVENTION

Vision systems that perform measurement, inspection, alignment of objects and/or decoding of symbology in the form of machine-readable symbols (also termed "IDs", such as a 2D matrix symbol) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes. The image is processed to identify barcode features, which are then decoded by a decoding process and/or processor obtain the inherent alphanumeric data represented by the code.

In operation, an ID reader typically functions to illuminate the scene containing one or more IDs. The illuminated scene is then acquired by an image sensor within the camera assembly through optics. The array sensor pixels is exposed, and the electronic value(s) generated for each pixel by the exposure is/are stored in an array of memory cells that can be termed the "image" of the scene. In the context of an ID-reading application, the scene includes an object of interest that has one or more IDs of appropriate dimensions and type. The ID(s) are part of the stored image.

A common use for ID readers is to track and sort objects moving along a line (e.g. a conveyor) in manufacturing and logistics operations. The ID reader, or more typically, a plurality (constellation) of readers, can be positioned over the line at an appropriate viewing angle(s) to acquire any expected IDs on the face(s) of respective objects as they each move through the field of view. The focal distance of the reader with respect to the object can vary, depending on the placement of the reader with respect to the line and the size of the object.

In setting up an ID reader system as part of a logistics arrangement, the user often requires specific information on the arrangement of objects and the associated symbols to properly configure reading of codes. Hence, the user/operator configuring often has access to sample objects, but does not know key configuration properties (such as the types of symbologies/IDs that will be enabled for decoding, length of encoded ID strings, use of checksum information, etc.). Other properties can also be derived or determined relative to the system—for example, line speed (of a conveyor of objects) and barcode resolution can be used to calculate certain camera properties, such as image frame rate. As used herein, the term "image frame rate" refers to the measure of time (speed) between successive camera cycles in which images are exposed and acquired by the sensor. The term "image acquisition rate" cane be used in various alternatives. The ability to determine and/or set the image frame rate is useful where the line is moving at higher speed. That is, the image frame rate should be high enough to ensure one or more images containing IDs of interest are clearly captures on each passing object. Obtaining and transmitting these properties or parameters to the system in an efficient, convenient and accurate manner is desirable, as is the ability to use such properties to assist in setting up and arranging appropriate system hardware.

SUMMARY OF THE INVENTION

This invention overcomes disadvantages of the prior art by allowing the user/operator of an ID reading (e.g. logistics) system to employ a commercially available mobile device to determine configuration properties for objects and associated IDs, and provide these in an automated manner to the processor of the ID reader.

In an illustrative embodiment a system and method is provided for configuring one or more camera assemblies in an ID decoding vision system that scans an object containing one or more IDs. A mobile device, having a camera and a processor, is arranged to acquire an image of an ID associated with the object and an image of features on a reference. A decoder, associated with the mobile device, decodes the ID associated with the object to derive properties and identifies features in the reference to derive a relative resolution of the ID associated with the object. A configuration process then translates the information into configuration data. Illustratively, a data store retains the configuration data for subsequent transfer to the ID decoding vision system and/or a transmission link transmits the configuration data the ID decoding vision system. The reference can comprise a card or label that has at least one of a calibrated fiducial and a self-describing fiducial. Additionally, the properties can contain/have at least one of a symbology type, string length, a usage of checksum of the ID associated with the object, a line speed of a conveyor of the object and an ID resolution. The camera image frame rate can be computed based upon the properties. Illustratively, the self-describing fiducial can contain/have an embedded ID with encoded physical dimensions of the self-describing fiducial that are decoded by the decoder. The reference and the ID associated with the object can be arranged adjacently so that the camera of the mobile device acquired an image containing both the reference and the ID associated with the object. Illustratively, the mobile device comprises a handheld device with a touchscreen and a wireless communication interface. A communication link can transmit the configuration data to a remote server that automatically determines setup information for the vision system based upon the configuration data and transmits at least one of (a) updated configuration information to the vision system and (b) hardware setup recommendations to a user of the vision system based upon the configuration data. In this manner, a user can be assisted by the manufacturer or distributor of the vision system hardware/software in purchasing, mounting and operating the system in a manner that is best suited to the particular ID-reading/decoding application.

In an illustrative embodiment the system and method can provide a mobile device having a camera and a processor arranged to acquire an image of an ID associated with the object, and an interface display screen that displays the image and allows manipulation of the image. A decoder is associated with the mobile device, which decodes the ID associated with the object to derive information therefrom. A resizing tool allows a location and physical dimensions of the displayed image of the ID associated with the object on the interface display screen so that the dimensions of the image of the ID associated with the object can be set to an approximate dimensions of the ID associated with the object when located adjacent to the display screen. A mapping process translates the dimensions of the image of the ID associated with the object to physical dimensions. A configuration process then translates the information and the physical dimensions into configuration data and transmits the configuration data the ID decoding vision system. The mapping process can have a correction factor for optical conditions that cause inaccuracy when viewing the image of the ID associated with the object relative to the ID associated with the object when located adjacently. The information illustratively contains at least one of a symbology type, string length, and a usage of checksum of the ID associated with the object. Illustratively, a data store retains the configuration data for subsequent transfer to the ID decoding vision system and/or a transmission link that transmits the configuration data the ID decoding vision system. The camera image frame rate can be computed based upon the information and dimensions. Additionally, the mobile device can comprise a smartphone or tablet with a touch screen and wireless network interface to transmit the configuration data. Illustratively, a communication link can transmit the configuration data to a remote server that automatically determines setup information for the vision system based upon the configuration data and transmits at least one of (a) updated configuration information to the vision system and (b) hardware setup recommendations to a user of the vision system based upon the configuration data. Illustratively, the processor can be arranged to acquire an image of an ID associated with the object when one or more predetermined criteria are met. The one or more predetermined criteria can include the relative orientation of the camera of the mobile device substantially perpendicular to a surface of the object (i.e. the relative skew).

In an illustrative embodiment, a system and method for communicating at least one of updated configuration information and hardware setup recommendations to a user of an ID decoding vision system is provided. The system and method acquires an image of an object containing one or more IDs with a mobile device. The mobile device has/contains a camera and a processor arranged to acquire an image of an ID associated with the object and a interface display screen that displays the image and allows manipulation of the image. The ID associated with the object is decoded to derive information therefrom. Physical dimensions of the ID associated with the object are determined. Based on the information and the dimensions, configuration data is transmitted to a remote server that automatically determines setup information for the vision system based upon the configuration data. The remote server thereby transmits at least one of (a) updated configuration information to the vision system and (b) hardware setup recommendations to a user of the vision system based upon the configuration data. In an embodiment, an image of features on a reference adjacent to the ID associated with the object and the ID itself is acquired. Features in the reference are identified and analyzed to derive a relative resolution of the ID associated with the object. In another embodiment an image of the ID associated with the object is displayed on a display screen of the mobile device. The display screen is located or positioned adjacent to the ID associated with the object so that both are visible concurrently by the user. The displayed image of the ID is then sized by the user or another process to match the ID associated with the object. Physical sizes for the dimensions of the ID associated with the object are then computed, based upon the (final) displayed and sized image of the ID.

BRIEF DESCRIPTION OF THE DRAWINGS

The invention description below refers to the accompanying drawings, of which:

FIG. 3 is a front view of an exemplary mobile device and associated touch screen interface for use in accordance with embodiments herein, showing an application for deriving/decoding configuration information from an image of an ID on an object according to an embodiment;

FIG. 4 is a front view of the mobile device and associated touch screen interface of FIG. 3 showing the use of the application to acquire an image of the ID on the object and properties derived/decoded from the ID;

DETAILED DESCRIPTION

I. System Overview

Figure 1:
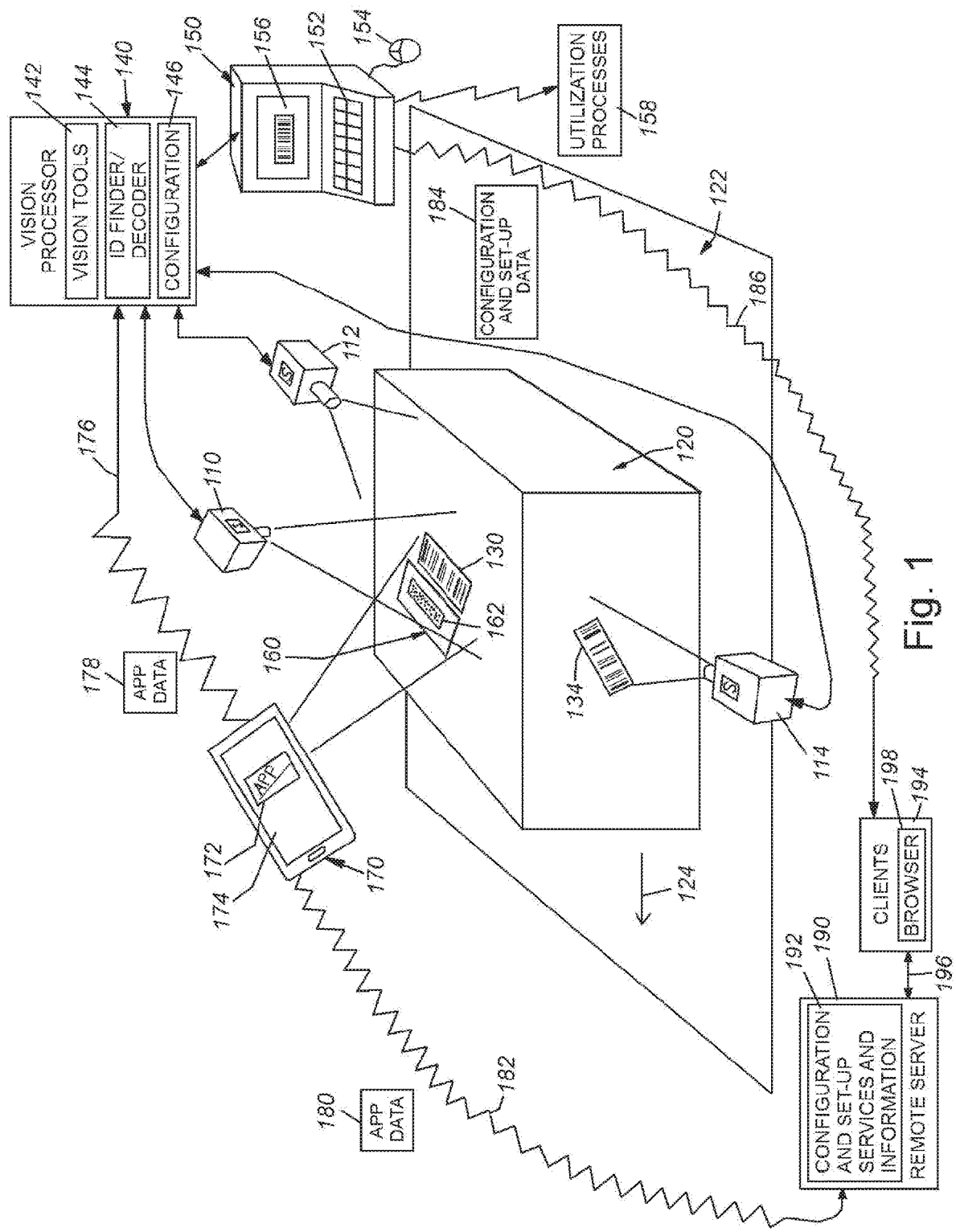
FIG. 1 is a diagram of a vision system for decoding IDs on an object including a plurality of camera assemblies that acquire images of the object from a respective plurality of perspectives, and including a mobile device adapted to configure the vision system according to an illustrative embodiment.

FIG. 1 shows an exemplary vision system arrangement 100 that includes a plurality (constellation) of vision system camera assemblies 110, 112 and 114 located at various positions around an object 120 that is directed on a conveyor 122 in a predetermined direction (arrow 124). The camera assemblies 110, 112 and 114 are adapted to image the various faces of the object 120 where barcodes (IDs) or other indicia 130, 134, which are of interest to the system, can reside. Each camera assembly includes an associated image sensor S and optics that define a field of view sufficient to image a desired area of the object at an expected distance from the respective camera. Note that the number and location of cameras depicted is exemplary and more cameras can be employed to fully image an object's visible faces.

The camera assemblies 110, 112, 114 can each include in internal or external vision system processor arrangement 140. The processors can be separate, and/or a common processor can be provided for a plurality of interconnected cameras. Alternatively, the processors can be arranged in a master-slave, or similar, arrangement, where one camera's (i.e. the master unit's) internal processor coordinates data acquisition and handling with respect to the data acquisition and handling of the other camera(s) (i.e. the "slave" unit(s)). The processor(s) can be general purpose (e.g. a microprocessor with software) or customized (e.g. an FPGA). A central processor for handling image data, or for performing other downstream data-handling tasks, can be provided using a general purpose computing device with appropriate software, such as a PC or server 150 having an associated user interface (keyboard 152, mouse 154, touchscreen display 156, etc.). This computing device 150 can also be used for calibration and setup of the various cameras 110, 112, 114, and can include appropriate software applications.

The computer/server can be arranged to transmit decoded ID information to various utilization processes and/or devices 158. For example, code information can be used to route packages down a sorting line or to perform inventory control.

The vision system processor(s) 140 typically include a set of vision system tools 142. The vision tools can be conventional and are designed to perform various tasks relative to acquired image data, including but not limited to, edge detection, blob analysis, pattern recognition, measurement (caliper), alignment, inspection, etc. These tools are used to detect features on the object and resolve ID-like candidate features for processing by the ID finding and decoding application 144. This application determines the location of an ID and the type of ID within the image and decodes the ID features to derive alphanumeric and/or other information. The ID can be any acceptable type of symbology, including but not limited to various 1D barcodes and 2D codes (e.g. QR, DataMatrix, DotCode). Decoded information is transmitted to a utilization system that can employ it for various logistics or material handling tasks, or other operations, such as inventory tracking/control, order fulfillment, package routing, load-balancing, etc.

It is contemplated that IDs (or other decodable features of interest) can be located at a various locations around the object. The dimensions (also sometimes termed "size") and type of ID can also vary. Because of this, system setup can be challenging. A general goal is to properly configure the vision system to read the dimensions and type of ID(s) located on objects in acquired images To do so, the user/operator provides the system with information as to whether the read ID is a large code or a relatively small code and other useful information—such as the type of ID, length of the code, checksum, etc.

As shown in FIG. 1, the object has been provided with a card, label or other applied element 160—for example, a business card—that includes an exemplary printed data structure 162. The printed data structure is placed so that both it and the object ID 130 appear in the same image (within the field of view/region of interest) acquired by the mobile device 170. Either on the conveyor line, as shown, or at a remote location, a handheld (mobile) device 170 with a camera—for example a conventional smartphone, such as one instantiating an Android® or iPhone® (iOS) operating system—acquires an image of the card 160 in combination with an adjacent ID 130. More particularly, the object ID 130 and card/label 160 are located adjacently so that they are both contained within the region of interest (filed of view) of the mobile device 170. Hence the image(s) acquired by the mobile device contain both data structures, allowing comparison—as described below. A mobile device configuration application 172 directs image acquisition by the handheld device 170.

II. Fiducials in Association with the Object ID

Figure 1A:
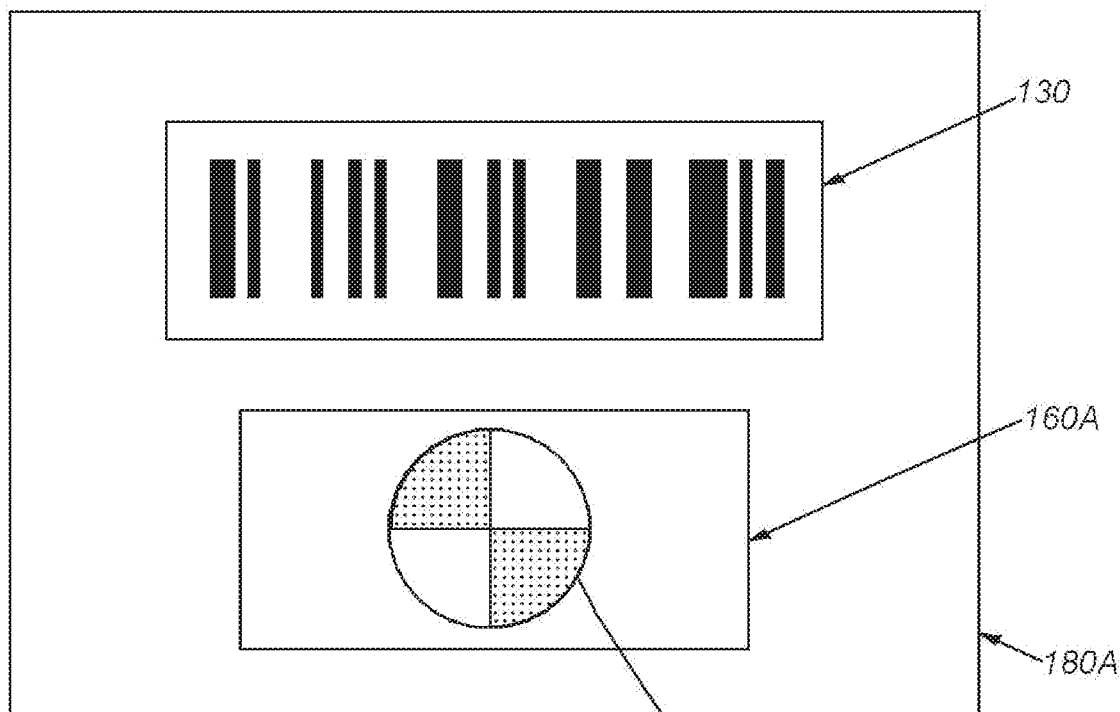
FIG. 1A shows an exemplary camera region of interest within a field of view containing an object ID and adjacent card or label with a calibrated fiducial used by the mobile device in configuring the vision system, according to an embodiment.

FIG. 1A shows an exemplary region of interest 180A, the printed data structure 162A on the card or label 160A can be one or more calibrated fiducials that have a known size and shape, and are recognized by the mobile device application as such. Based on the image(s) acquired by the device 170, the application 172 compares the known size and shape of the fiducial(s) 162 with that of the adjacent object ID 130. This comparison allows the application 172 to derive the object ID's dimensions (scale) and other properties. The object ID is also decoded and analyzed to determine code type, checksum and other associated information. All of this configuration information can be transmitted to the vision system as application data 178 over the communication link (wired, wireless, etc.) 176, depicted in FIG. 1.

Figure 1B:
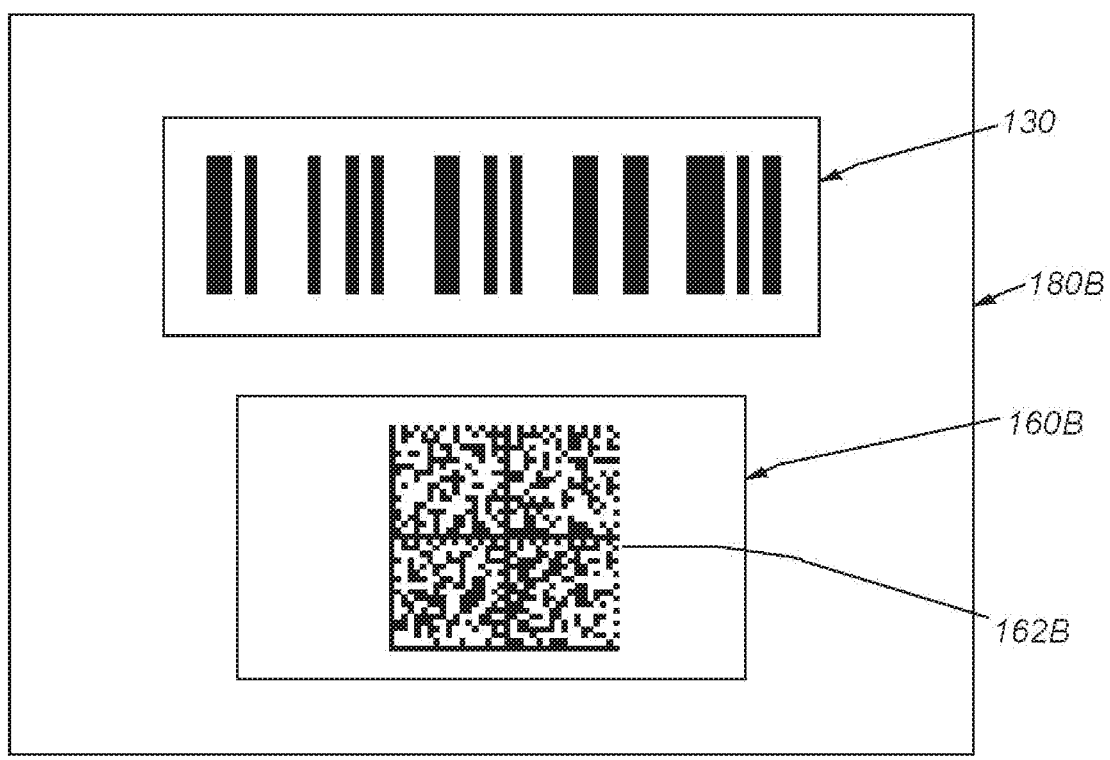
FIG. 1B shows an exemplary camera region of interest within a field of view containing an object ID and adjacent card or label with a self-describing ID used by the mobile device in configuring the vision system, according to an embodiment.

Alternatively, as shown in FIG. 1B, the region of interest 180B can include a card or label 160B with one or more fiducial(s) in the form of an ID—for example the depicted DataMatrix 162B. This exemplary fiducial is, thus, self-describing in that it has embedded in its coded information various properties relative to the fiducial. The device configuration application 172 decodes the self-describing fiducial (ID 162B) contained on the card/label, and uses the information to derive specific details about the self-describing fiducial 162B itself. In general, the read/decoded ID information relates to the self-describing fiducial's real-world dimensions/scale. This allows the self-describing fiducial 162B to be compared to the object ID 130 so that its relative real-world dimensions/resolution (scale) can be determined by way of comparison within the image. The comparison can be performed in a variety of ways. In an embodiment, edges are detected and the boundaries of each structure (the fiducial and the object ID) are determined. This allows a relative size of each structure to be determined and, since the real world dimensions for the fiducial are known, the relative dimensions of the object ID can be computed based on a percentage difference.

Having derived the resolution/scale of the object ID through comparison with the fiducial (162A or 162B), the device configuration application 172 can also derive other information related to the object ID 130 for use in setting up the vision system. The object's ID(s) can be read and decoded to compute code type, code length, checksum, content format (e.g. two alpha characters followed by 10 numeric characters), and/or any other information that is helpful to assist the vision system and its associated process (or) in more accurately and efficiently finding and decoding IDs located on the object that appear in the field of view of one or more of the constellation of camera assemblies 110, 112, 114. The process can also be adapted to selectively locate IDs having certain properties, types and/or resolution and thereby ignore or discard those that do not fall into one or more of the desired criteria—thus omitting incidental IDs that are not employed during runtime operation.

In an alternate embodiment, the self-describing fiducial can be generated (and printed out) by an appropriate application for use at the time of training with various object ID properties and/or system parameters encoded into it. These properties can be encoded into the self-describing ID based upon a visual inspection of the object ID—for example, the self-describing fiducial can be created to include the object ID type (e.g. Code 128). The self-describing fiducial can also include other aspects of the vision system setup—such as the line speed of the conveyor. These parameters can be provided to an interface on the device by the user in response to appropriate interface prompts or input boxes that then generates a corresponding self-describing fiducial with the parameters included in the code. The additional information embedded in the code can be used to assist setup and configuration.

The handheld/mobile device 170 can include a touch-screen 174 and/or other appropriate user-interface elements as shown to operate the application 172 and display results. The device 170 typically includes a wired or wireless interconnect or link 176 that enables data transfer between the device 170 and the processor 140. This connection 176 can be enabled by a variety of modalities, such as LAN or Wi-Fi-based Ethernet, Bluetooth®, USB, etc. The camera in the device 170 can include an illuminator as appropriate. This illuminator can be the camera/device's general-purpose, integrated flash assembly. The device camera and illuminator are adapted by the application 172 to acquire an image of the region containing the ID and the associated card or label 162. The application 172 also includes a 2D area-scan image-based barcode reading/decoding application. This ID-reader application interoperates with the application 172 to derive useful information from the decoded ID on the card/label 162. As described above, such information can include code type (symbology), string length, checksum, etc.

Figure 2:
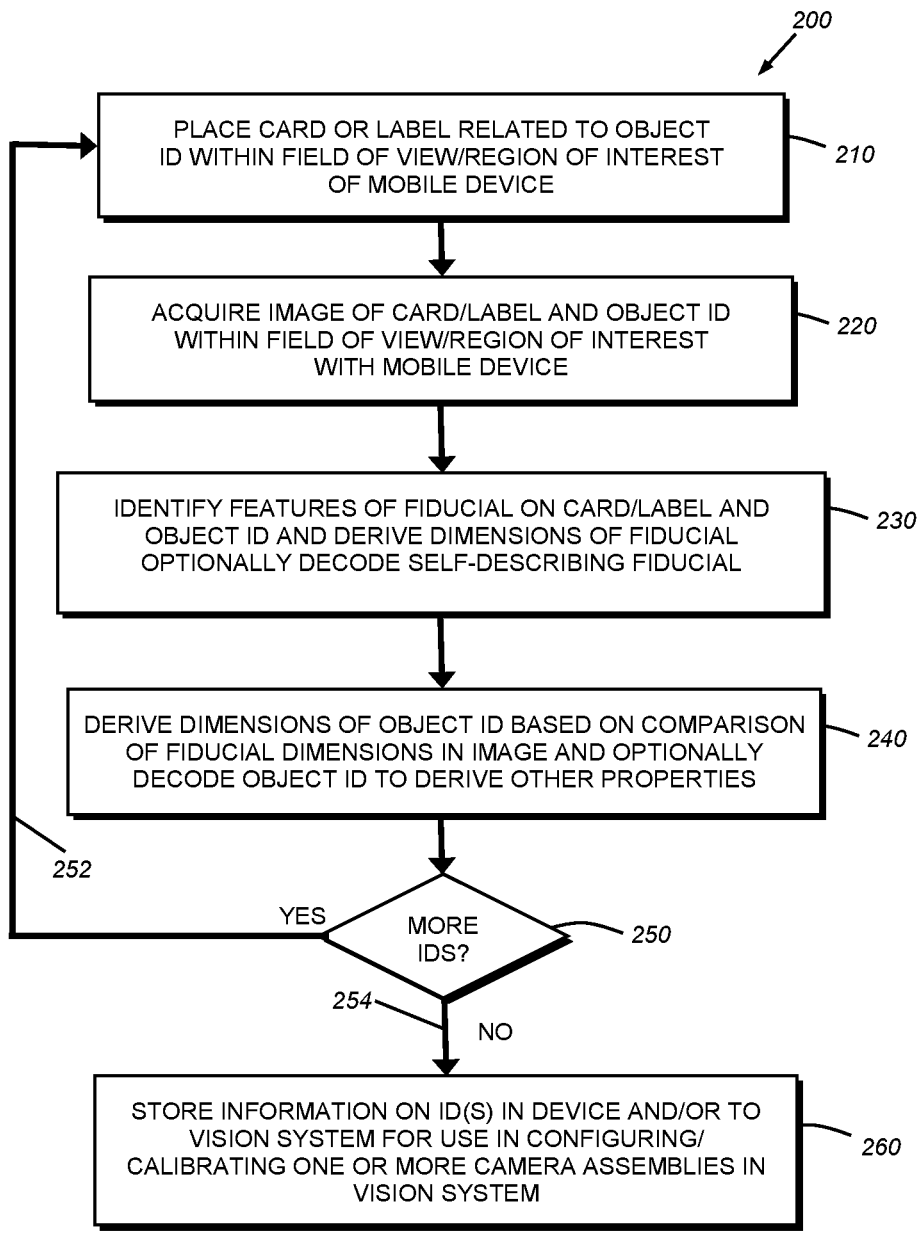
FIG. 2 is a flow diagram showing a procedure for acquiring images of a reference and employing information decoded therefrom to configure the vision system of FIG. 1 according to an embodiment.
Figure 5:
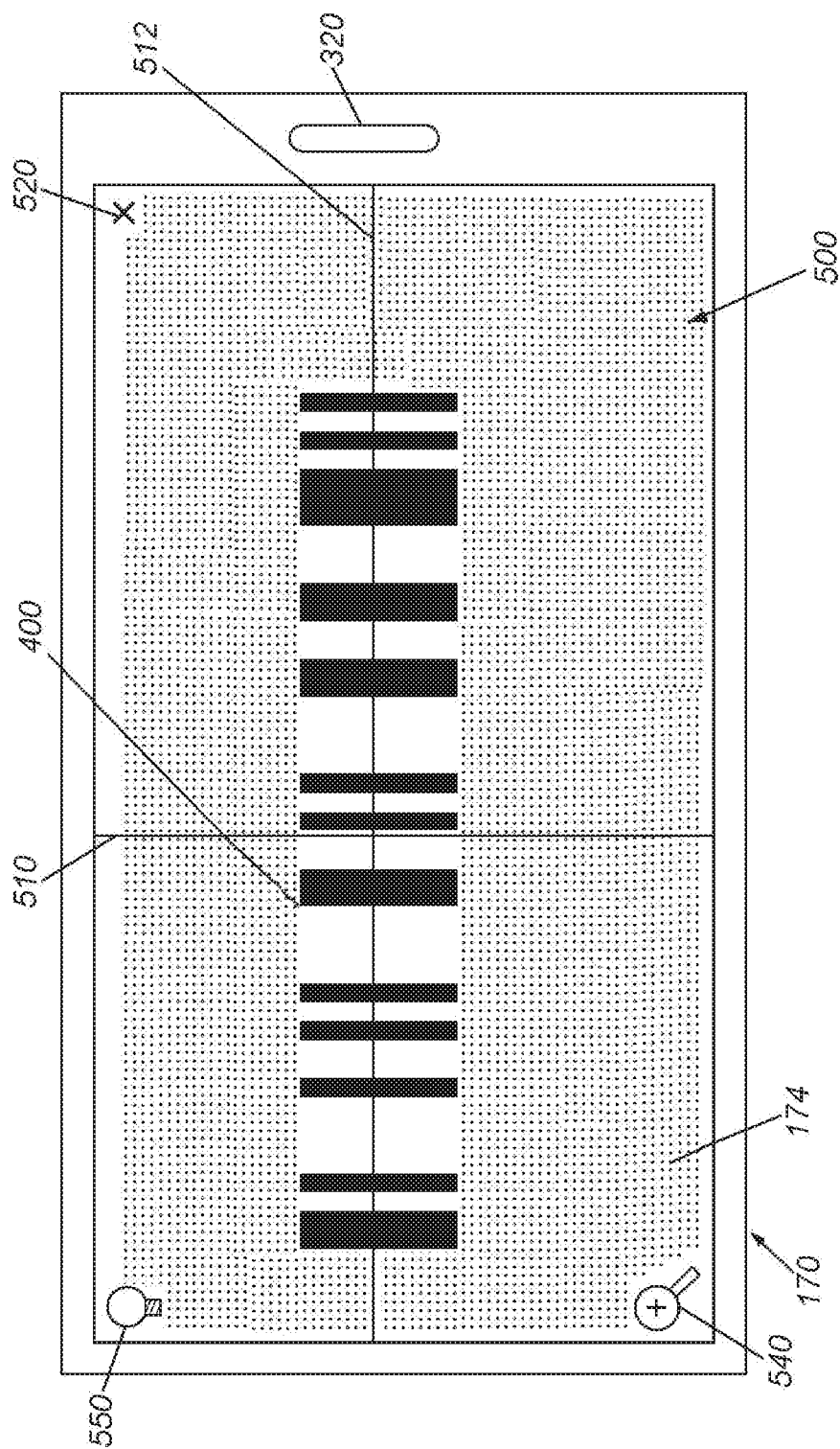
FIG. 5 is a front view if the mobile device and associated touch screen interface of FIG. 3 showing the operation of the measurement process to display a full size user-manipulable version of the image of the object ID on the touch screen display.

With reference to FIG. 2, a procedure 200 for configuring one or more ID-reading vision system camera assemblies is shown. In step 210, the card or label with the fiducial (calibrated and/or self-describing) is placed a surface adjacent to an example of the regular runtime ID provided on the object so that both the fiducial and the object ID are imaged concurrently within the same field of view and/or region of interest (i.e. in one image) by the mobile device. Then, in step 220, the user or operator uses the application on the mobile device to acquire an image of the fiducial and object ID together. The image can be triggered directly by a function in the mobile device configuration application (172 in FIG. 1) or it can be acquired using a conventional camera application on the device and stored for use by the application 172. In general, the application 172 can employ an API or other functionality to operate the camera application on the device and transfer the acquired image into the application for further processing. In step 230, the features in the image corresponding to the fiducial and the object ID are found. These are used to derive the physical dimensions of the fiducial in the image—either based on calibration data stored in the application 172 or by operating a conventional ID decoding application in the device to extract properties from a self-describing fiducial (e.g. DataMatrix). In step 240, the dimensions/resolution (scale) of the object ID are derived by comparing the physical size of its features to that of the fiducial in the same image. This can be accomplished using various techniques clear to those of skill in the art. The object ID can also be optionally decoded by the mobile device decoding application to derive particular inherent properties, such as symbology, string length, and usage of checksum. Note, like the camera application, the decoding application can be a conventional process that is interfaced with the application via an appropriate functionality (e.g. an API). As a plurality of codes can reside on the runtime object, the user/operator can repeat the process (steps 210-240) for each ID of a set of examples containing all ID code types and/or resolutions to be read (decision step 250 and procedure branch 252). When complete (decision step branch 254), the application can store the determined properties as configuration information for subsequent use—e.g. the upload to the vision system at a later time—and/or the determined properties can be stored on the device for use in other follow-on processes. The application can also direct the mobile device to contemporaneously or subsequently communicate the determined properties to the vision system and associated ID finding and decoding process(or) via the network (step 260). This technique is particularly useful when configuring multiple readers, such as the constellation of readers in a logistics tunnel system.

As described above, the process 200 can be modified, wherein the user/operator places a calibrated fiducial in close proximity, and on same plane as, the exemplary object ID sample. In this embodiment, the user/operator uses mobile application to acquire image of both fiducial and barcode, both of which are decoded (step 220). From the barcode, properties such as symbology, string length, usage of checksum can be determined (step 230). From the relative dimensions and scale of the calibrated fiducial relative to the code, the resolution of the code can be determined (step 240). The user/operator repeats (via decision step 250 and branch 252) process steps 210-240 for a set of exemplary object IDs containing all code types to be read. When complete (decision step 250 and branch 254), the application directs the mobile device communicates these properties to the vision system via the network (step 260).

III. Direct Sizing of Object ID Relative to Device Display

According to another illustrative embodiment, the application on the mobile device is adapted to allow the user/operator to directly manipulate a displayed image of the exemplary object ID so as to derive properties and dimensions/resolution. The application interoperates with the device operating system (iOS, Android, etc.) and peripheral programs (e.g. camera, illumination, networking, etc.) using techniques and functionalities known to those of skill. This procedure to manipulate the image, and derive various properties from the ID, is shown by way of non-limiting example in the device interface screen displays of FIGS. 3-8. As shown in FIG. 3, the user accesses the device interface screen 174, which contains one or more icons 300 that allow initiation of the device application. The device 170 includes a conventional processor 310 and memory 312 arrangement, and other associated functional components (e.g. network interface, accelerometers, wireless transceiver(s), audio and video drivers, etc.) (Not shown). The device 170 can also include one or more mechanical buttons or switch(es) (e.g. a "home" button) 320. More generally, the device associated with this embodiment defines a screen 174 that is sized and arranged to image an ID at that same same/resolution as the actual ID provided on the object. Typically, the screen 174 is framed by a narrow, opaque edge 330 about the screen perimeter 332 of varying thickness. In some exemplary devices, the thickness can be relatively small (a few millimeters along one or more edges.

By operating the application, and as shown in FIG. 4, the device camera acquires an image of the exemplary ID (e.g. an actual ID on an object) and displays the captured image of the physical ID 410 on the interface screen 400 in an appropriate window 412. This acquisition occurs after operating the START SCANNER button 420. As part of the acquisition, the ID is decoded using the decoding application (340 in FIG. 3) stored in the device 170. The type of barcode (e.g. Code 128) is determined and displayed (430) by the application. The information is decoded (e.g. MYDATA123 (432). The x-axis and y-axis module count is determined and displayed (434). The x-axis and y-axis ID module dimensions are also determined and displayed (436). In addition, the skew (438) can be determined and displayed. The determined and displayed data can optionally include image pixel array locations for the ID (440). The display can indicate to the user whether the locations are acceptable or not. For example, the ID can be successfully read, however, the skew can still indicate an unacceptable or unfavorable perspective for the mobile device camera relative to the surface of the object. This feedback can assist the user in generating a better image to manipulate/resize, or can be used to reject (by the user or in an automated manner) the decoded image until the appropriate criteria is met. In further embodiments other criteria can be included, such as the distance from the device camera to the surface, lighting, rotation, etc.

The screen 400 also includes a MEASURE button 450. By activating the MEASURE button 450 the code image fills the device screen 174, as shown by interface display 500 in FIG. 5. As described above, it is contemplated that the size of the display 174 allows an ID to be displayed at an actual size that is at least as large as the actual, exemplary ID on the object. The ID 400 is generally centered within the displayed crosshairs 510, 512 of the display 500. The exemplary display 500 includes a close (X) button 520 at one corner, a magnify button 530 at another corner and an illumination button 550 at another corner—which operates the device illuminator to improve the acquisition of the image if needed.

Figure 6:
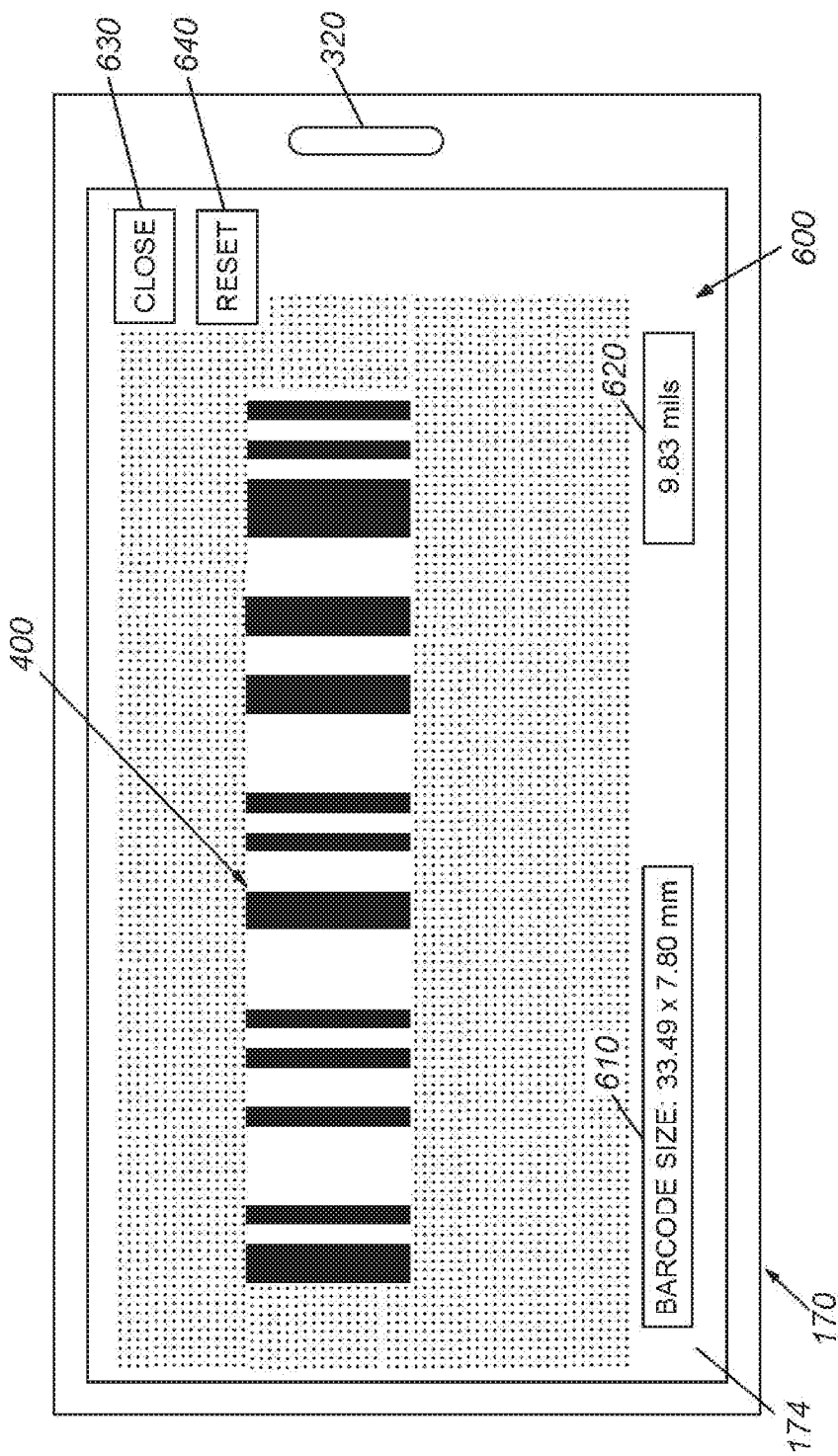
FIG. 6 is a front view of the mobile device and associated touch screen interface of FIG. 3 showing the display of the image of the ID on the object with its relative physical size.
Figure 7:
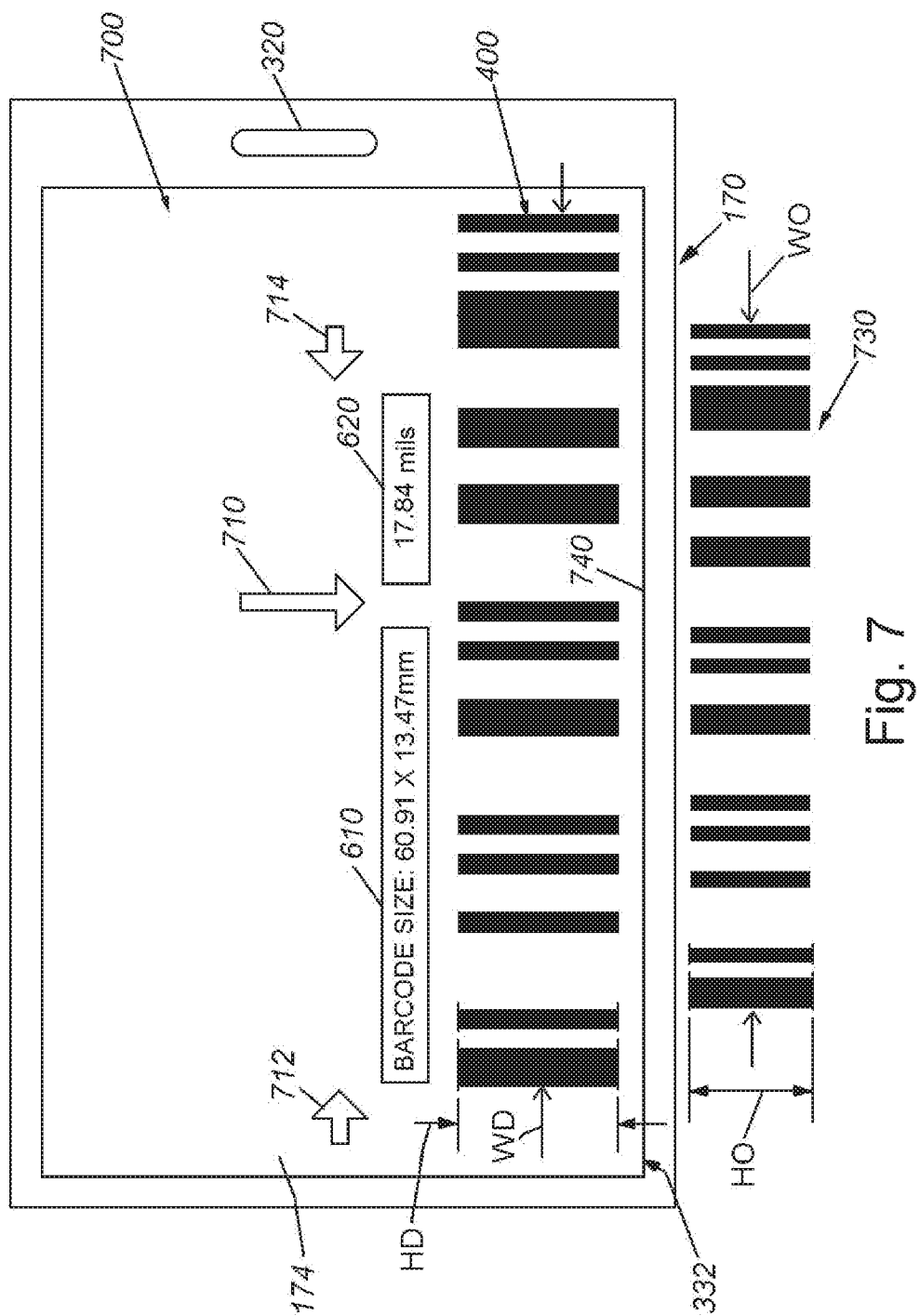
FIG. 7 is a front view if the mobile device and associated touch screen interface of FIG. 3 showing the manipulation of the image of the ID on the object to move and size it relative to the adjacent actual ID on the object from which the image was acquired.

In the display 600 of FIG. 6, the interface includes a window 610 that denote the current overall size (x and y-axis dimensions) of the displayed version of the ID 400 in millimeters, as well as a window 620 with measurement of the ID in mils. A close button 630 allows this display 600 to be closed when complete and a reset button 640 allows the measurement to be repeated.

The display 600 can be manipulated to change the relative dimensions/resolution of the ID 400 as well as the location of the ID on the display screen 174. As shown in the display 700 in FIG. 7, the user/operator can employ finger motions (represented by arrows 710, 712 and 714) in contact with the screen (i.e. a touch screen interface) 174 to expand or reduce the size of the displayed ID 400, and to reposition the ID relative to perimeter 332 of the screen 174. In the depicted example, the exemplary object ID 730 has a physical size defined by height HO (y-axis) and length/width WO (x-axis). Conversely, the size of the displayed ID is depicted as larger, with a height HD and a length/width WD. As depicted in windows 610 and 620, the exemplary ID dimensions are 60.91×13.47 millimeters and 17.84 mils. The reported dimensions are based on a mapping by the application of the pixel locations of the edges of the displayed ID 400 versus the know dimensions/scale of the screen in millimeters and pixels-per-millimeter. These values allow the application to translate a displayed ID into corresponding physical dimensions.

Figure 8:
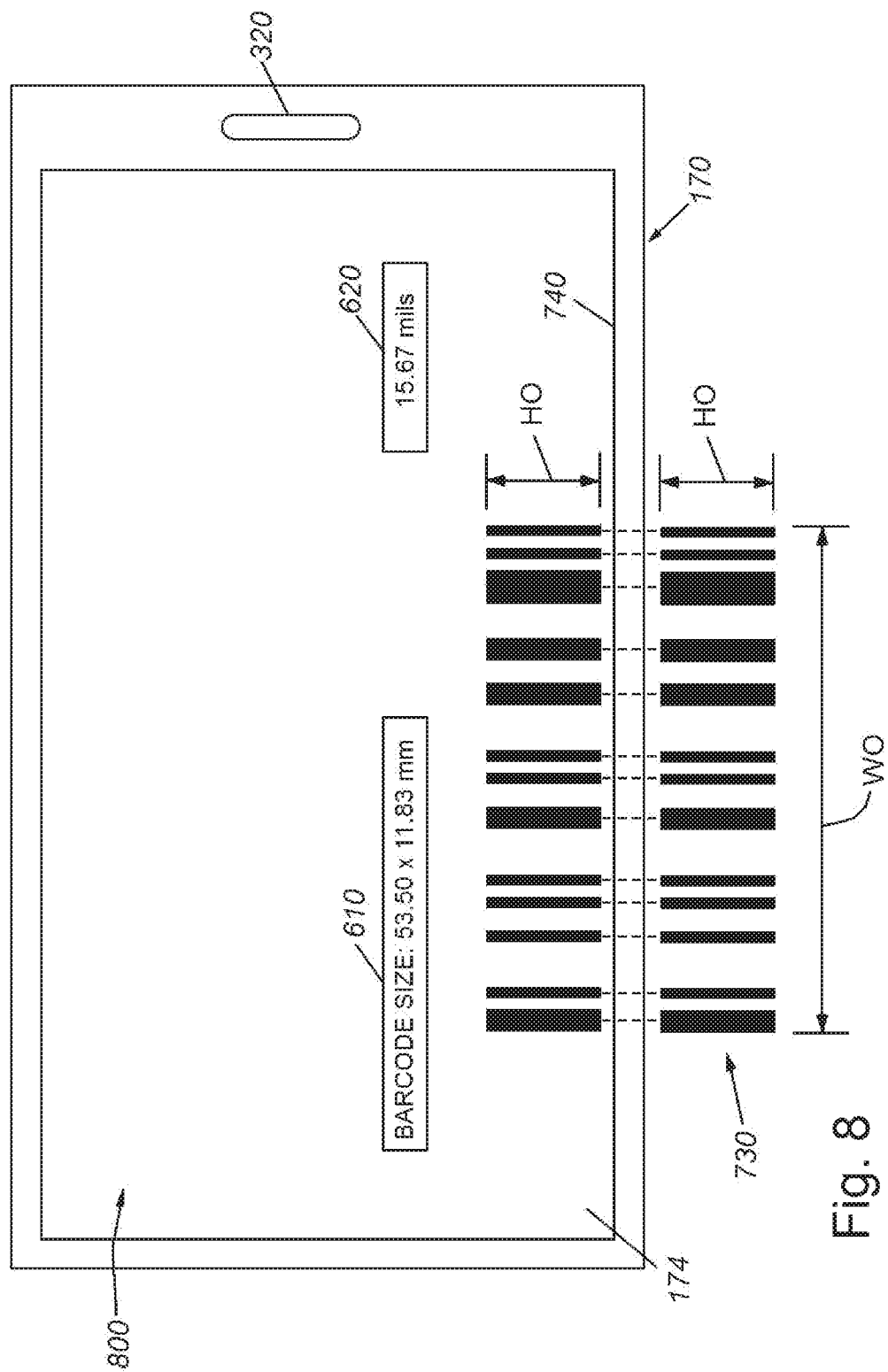
FIG. 8 is a front view if the mobile device and associated touch screen interface of FIG. 3 showing the image of the ID on the object resized by the user to approximately match the dimensions of the actual ID on the object and relative physical dimensions thereof displayed—such dimensions to be transmitted as part of the properties of the ID to the vision system configuration process.

Thus, when the user/operator manipulates the touchscreen function of the display 174 (via arrows 710, 712 and 714), he or she can move the displayed ID 400 adjacent to an edge 740 of the screen and cause the overall dimensions of the ID in height and width to contract so that it is relatively close in dimensions to the actual object ID 730. Hence, as shown in FIG. 8, the display 800 is manipulated so that the displayed ID 400 is aligned with the object ID 730. The height of each ID HO is the same or similar and the width WO of each ID is also the same or similar. The application computes the current dimensions of the displayed ID 400, as shown in boxes 610 and 620. In this example, the size has been reduced from that of FIG. 7 to 53.50×11.83 millimeters and 15.67 mils. These dimensions represent the approximate dimensions of the object ID and are recorded in the device memory as such.

The functions that allow the interface to "zoom" an image are generally available on touchscreen devices and it should be clear to those of skill how such are implemented and employed. With practice, a user/operator can manipulate the actual dimensions of individual, exemplary object IDs quickly and easily. Each time ID dimensions are determined, the application can be directed to transmit this information to the vision system, where it becomes recorded as configuration information. Alternatively, the measured information can be accumulated on the device or another intermediary system/modality (for example, a network-attached storage device, cloud computing/storage environment) before transmission to the vision system. Optionally, the intermediary can distill the results generated by the app—for example, ultimately transmitting only ranges (minimum and maximum) of properties to the reader, thereby reducing the amount of data transmitted and stored by the vision system, and sharing processing tasks with the device. When the vision system encounters IDs on an object it already includes information as to the ID type and approximate dimensions so that it can readily adapt to identify and decode the ID features.

Briefly, the steps for operating the application in accordance with FIGS. 4-8 are described as follows. The user/operator reads an exemplary object ID with the mobile device by acquiring a camera image. The application decodes the read ID. The user/operator then "zooms" decoded image to match physical dimensions of actual object code, generally placing the codes in close proximity so as to provide an acceptable visual reference for the zooming/sizing operation. The application then employs information from the decoded image and information from mobile device's physical screen size to calculate/estimate actual ID dimensions in real-world units (e.g. millimeters, inches, mils, etc.). The procedure can be repeated for each ID on the object until the vision system has all relevant configuration information. Optionally, the information can be associated with certain cameras in the overall constellation that are likely to encounter the particular type of ID. Notably, this approach can be performed free of the use of the above-described, embedded 2D matrix (or other symbology) code with configuration information related to the actual object ID as a fiducial.

It is contemplated that the thickness of the device can cause the actual object code and screen-displayed code to be slightly misaligned or mismatched during the measurement process (due to parallax, etc.). This can be compensated in part by obtaining a label or other thin, printed version of the code and laying it atop the screen of the device adjacent to the displayed code. Alternatively, the application can include a built-in correction factor that accounts for the perspective between the actual code and the screen-displayed code. In general, the error factor, for most users is relatively small even without (free of) any correction—on the order of 0.4 mils or less.

VII. Additional Setup and Configuration Tasks

Reference is made again to FIG. 1, which shows the transmission of data from the device application 172 over a communication medium/link (e.g. wireless LAN, Internet, etc.) to a remote server 190. Likewise, various configuration and setup data 184 can be transferred via a wired or wireless link 186 (LAN, WAN, Internet, etc.) to the server 190. The server 190 can be any acceptable arrangement of computing devices in a local or distributed environment (e.g. a cloud). The server 190 includes a variety of applications 192 that interact with its operating system and network interface components, including those that handle the configuration and setup of vision system cameras. More particularly, the applications 192 collect user application requirements and automatically determine a physical solution and configuration of the vision system software. These solutions are delivered to client computing devices (for example via a web browser 198) over an appropriate network (e.g. LAN, Internet) link 196. Such client computing devices can reside with the manufacturer of vision systems—for example its service and sales department and/or with the end user. The computer 150 operating the vision system can receive information from the server 190.

Figure 9:
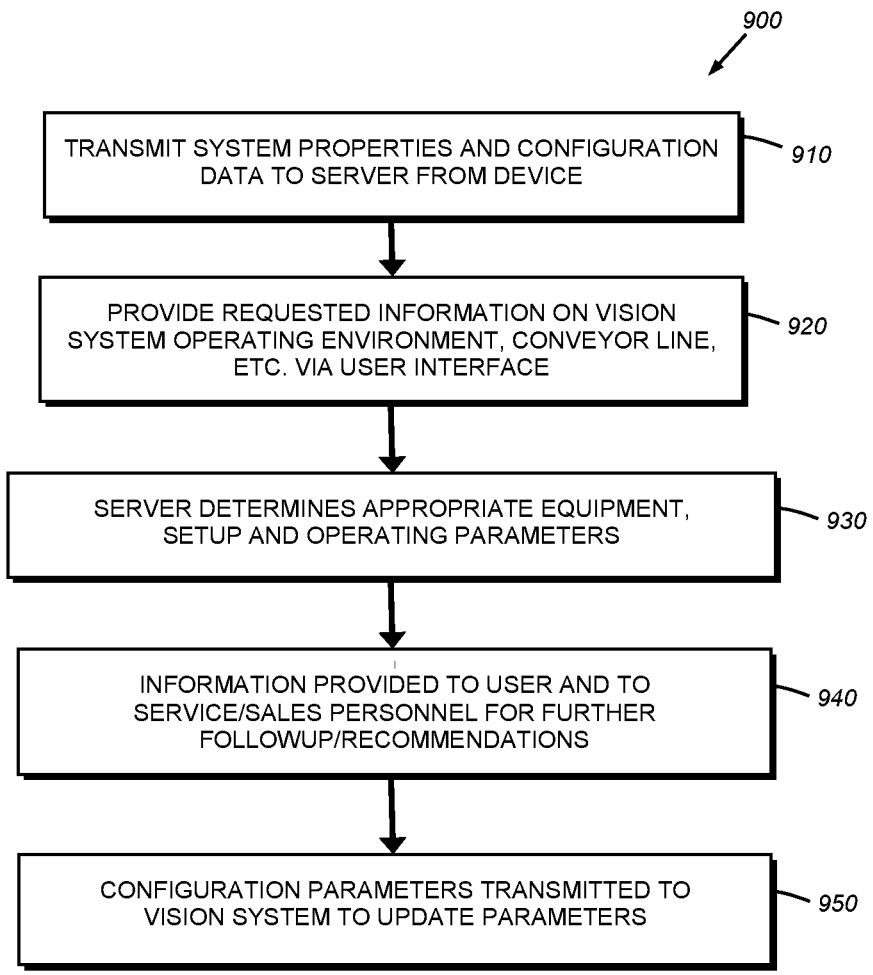
FIG. 9 is a flow diagram showing a procedure for transmitting and utilizing configuration data generated by the mobile device to update vision system setup p[parameters and recommend appropriate vision system hardware setup for the arrangement.

With further reference to the generalized procedure 900 of FIG. 9, in step 910 the mobile device 170 transmits system properties and configuration data generated during the setup procedure or during a data-gathering process directly to the server or via the vision system 150. This transmitted data can include the resolution and type of various IDs. The vision system can also transmit the number of cameras in the system, type of cameras, interconnected illumination, etc. In step 920, the device or vision system also query the user as to other needed information—for example the speed of the line, its width, the available height/distance from the object which camera are (or can) be mounted. If cameras and other equipment have not yet been setup, this can be accounted-for in the process. In step 930, the server receives this information and any other information deemed relevant to setup and configuration and processes it based upon a knowledge base of available equipment and capabilities. This can include various performance specifications on cameras, their available optics packages, illumination and image frame rate(s). For example, if a user specifies a 4-foot wide line with 2 feet of distance to the object, the server locates three different camera models that are appropriate in groups of four, with an appropriate optics and illumination package. This information can be provided to the user and also various sales and support personnel in step 940. If cameras are already in place, the server computes the best exposure, illumination level, etc. for those cameras, as well as the appropriate vision system software for the situation. In step 950, it can also download such computed information and software to the user vision system certain vision system applications to assist in locating and decoding particular types and resolutions of IDs, etc.

V. Conclusion

It should be clear that each of the above illustrative embodiments provides a reliable and effective technique for providing configuration information to a vision system that can include an array of cameras for finding and decoding IDs on objects. The system and method ensures that the vision system is prepared to identify IDs of certain types and sizes that are likely to appear on the object. This addresses the possibility that the printed IDs on the object can vary significantly in dimensions/resolution and type. The above-described system and method also allows for communication of system setup and configuration information to a remote server that can employ such information to automatically update the arrangement and suggest appropriate equipment.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system. Significantly, while the mobile device shown is a so-called "smartphone", any handheld device that is capable of acquiring images, operating an ID decoding application, and other loaded applications, and transmitting data to a remote system (wired or wirelessly) can be employed. Thus the term device should be taken broadly to include (but not be limited to) tablets, laptop computers, PDAs and certain cameras, as well as purpose-built handheld devices. Also, while the illustrative application and decoding functionality are instantiated as programs on the mobile device all or part of their functions can be performed by a remote computer (e.g. a server-based or cloud-based computing environment) where appropriate. Additionally, while the sizing of the displayed ID image is accomplished by use of a touchscreen, it is contemplated that the user can employ other indirect interface tools, such as a mouse, trackball, etc. to accomplish sizing or a separate camera assembly, viewing both the displayed ID and actual ID adjacent to each other (or generally within the same field of view) can be used to resize the image of the ID to match the dimensions of the actual object ID. Other techniques for resizing the displayed ID to match the actual object ID are also contemplated according to skill in the art. Accordingly, this description is meant to be taken only by way of example, and not to otherwise limit the scope of this invention.

What is claimed is:

1. A system for configuring one or more camera assemblies in an ID decoding vision system that scans an object containing one or more IDs comprising:
    a mobile device having a camera and a processor, the camera being arranged to acquire an image of an ID associated with the object, the mobile device further comprising an interface display screen that displays the image and allows manipulation of the image;
    a decoder associated with the mobile device that decodes the ID associated with the object to derive information therefrom;
    a resizing tool that allows a location and physical dimensions of the displayed image of the ID associated with the object on the interface display screen to be manipulated so that the dimensions of the image of the ID associated with the object can be set to an approximate dimensions of the ID associated with the object when located adjacent to the display screen;
    a mapping process that translates the dimensions of the image of the ID associated with the object to physical dimensions; and
    a configuration process that translates the information and the physical dimensions into configuration data and transmits the configuration data the ID decoding vision system.

2. The system as set forth in claim 1 wherein the mapping process has a correction factor for optical conditions that cause inaccuracy when viewing the image of the ID associated with the object relative to the ID associated with the object when located adjacently.

3. The system as set forth in claim 1 wherein the information contains at least one of a symbology type, string length, and a usage of checksum of the ID associated with the object.

4. The system as set forth in claim 1 further comprising at least one of a data store that retains the configuration data for subsequent transfer to the ID decoding vision system and a transmission link that transmits the configuration data the ID decoding vision system.

5. The system as set forth in claim 1 wherein the camera image frame rate is computed based upon the information and dimensions.

6. The system as set forth in claim 1 wherein the mobile device comprises a smartphone or tablet with a touch screen and wireless network interface to transmit the configuration data.

7. The system as set forth in claim 1 further comprising a communication link that transmits the configuration data to a remote server that automatically determines setup information for the vision system based upon the configuration data and transmits at least one of (a) updated configuration information to the vision system and (b) hardware setup recommendations to a user of the vision system based upon the configuration data.

8. The system as set forth in claim 1 wherein the processor is arranged to acquire an image of an ID associated with the object when one or more predetermined criteria are met.

9. The system as set forth in claim 8 wherein the one or more predetermined criteria defines at least one of (a) angular orientation of the camera of the mobile device with respect to a surface of the object, (b) distance from the camera of the mobile device to the surface, and (c) rotation of the camera of the mobile device with respect to the surface.

10. A method for communicating at least one of updated configuration information and hardware setup recommendations to a user of an ID decoding vision system comprising the steps of:
    acquiring an image of an object containing one or more IDs with a mobile device having a camera and a processor, the camera being arranged to acquire an image of an ID associated with the object and an image of features on a reference adjacent to the ID associated with the object, the mobile device further comprising an interface display screen that displays the image and allows manipulation of the image;
    decoding the ID associated with the object to derive information therefrom;
    determining physical dimensions of the ID associated with the object based at least in part on the features on the reference; and
    based on the information and the dimensions, transmitting configuration data to a remote server that automatically determines setup information for the vision system based upon the configuration data and transmits at least one of (a) updated configuration information to the vision system and (b) hardware setup recommendations to a user of the vision system based upon the configuration data.

11. The method as set forth in claim 10 wherein the step acquiring comprises concurrently acquiring an image of the features on the reference adjacent to the ID associated with the object and the step of determining further comprises identifying features in the reference to derive a relative resolution of the ID associated with the object.

12. The method as set forth in claim 10 wherein the step of determining comprises displaying an image of the ID associated with the object on a display screen of the mobile device, locating the display screen adjacent to the ID associated with the object, sizing the displayed image of the ID to match the ID associated with the object and computing physical sizes for the dimensions based upon the displayed and sized image of the ID.

13. The method as set forth in claim 10 further comprising at least one of a data store that retains the configuration data for subsequent transfer to the ID decoding vision system and a transmission link that transmits the configuration data the ID decoding vision system.

* * * * *